United States Patent [19]

Shama et al.

[11] Patent Number: 4,889,901
[45] Date of Patent: Dec. 26, 1989

[54] ULTRAVIOLET-CURABLE BLENDS OF ACRYLATED POLYURETHANES AND SILSESQUIOXANE OLIGOMERS HAVING IMPROVED ADHESION TO GLASS

[75] Inventors: Sami A. Shama; John L. Derer, both of Des Plaines, Ill.

[73] Assignee: DeSoto, Inc., Des Plaines, Ill.

[21] Appl. No.: 271,659

[22] Filed: Nov. 16, 1988

[51] Int. Cl.$^4$ .............................................. C08F 30/08
[52] U.S. Cl. ..................................... 526/279; 428/391
[58] Field of Search ......................... 526/279; 428/391

Primary Examiner—Joseph L. Schofer
Assistant Examiner—Alex H. Walker
Attorney, Agent, or Firm—Dressler, Goldsmith, Shore, Sutker & Milnamow, Ltd.

[57] ABSTRACT

A light-curable ethylenically unsaturated liquid coating composition which cures to provide low modulus coatings adapted for the primary or single coat coating of optical glass fiber and having improved adhesion is disclosed. This composition comprises:

(1) an acrylate-terminated polyurethane oligomer;
(2) a monoethylenically unsaturated liquid having a glass transition temperature, measured on a homopolymer thereof, below about 0° C. and which reduces the glass transition temperature of the coating; and
(3) a silsesquioxane oligomer polyacrylate which is the condensation reaction product of about two moles of hydroxyalkyl acrylate in which the alkyl group contains from 2 to 4 carbon atoms, with about one mole of a silsesquioxane polysilanol, the proportion of the silsesquioxane oligomer polyacrylate is in the range of from about 2% to about 60% of the weight of the coating composition.

12 Claims, No Drawings

ULTRAVIOLET-CURABLE BLENDS OF ACRYLATED POLYURETHANES AND SILSESQUIOXANE OLIGOMERS HAVING IMPROVED ADHESION TO GLASS

TECHNICAL FIELD

This invention relates to ultraviolet-curable blends of acrylate-terminated polyurethanes and silsesquioxane oligomers which exhibit improved adhesion of glass, and more particularly to the glass surface of optical glass fiber. Coating compositions which cure rapidly to form low modulus coatings and have improved water resistance as well as improved adhesion are particularly contemplated.

BACKGROUND ART

Ultraviolet-curable coatings based on acrylate-terminated polyurethanes are well known and in use to provide rapidly curing coatings for the coating of optical glass fiber. In some instances the optical glass fiber is coated with a primary coating comprising such acrylate-terminated polyurethanes and then overcoated. In other instances the optical glass fiber is coated with a single coating comprising such acrylate-terminated polyurethanes. In either instance it is essential to provide ultraviolet-curing coatings which cure rapidly on exposure to such radiation and which provide good water resistance and improved adhesion to the glass surface.

Acrylated polyurethanes based on polyether diols are frequently used in optical fiber coatings, but the polyether linkages in these diols do not provide the best water resistance. To improve the water resistance, efforts have been made to use diols or other polyhydric alcohols which are polyesters or polycarbonates in the formation of the acrylated polyurethane. The acrylated polyurethanes made with these polyesters or polycarbonates possess better water resistance. However, the low modulus needed for the primary coating or single coating of optical glass fiber requires the addition of greater amounts of reactive diluents than when polyethers polyurethanes are used in order to lower the modulus of the coatings so that these polyester or polycarbonate-based polyurethanes can be used. These reactive diluents may contribute to poor adhesion and/or poor water resistance, so this minimizes the utility of the more water-resistant polyurethanes.

It is noted that other agents can be used to enhance the adhesion of ultraviolet curing coatings containing acrylate-terminated polyurethanes, but these other aagents tend to considerably impair the speed of cure. Ultraviolet-curing coatings are used to maximize production speed, and those who use such coatings in the production of coated optical glass fiber are generally unwilling to sacrifice cure speed.

The present invention employs acrylate-terminated polyurethanes in low modulus coatings which exhibit improved water resistance and improved adhesion. It is a feature of this invention to do this using polycarbonate or polyester-based polyurethanes to maximize the water resistance which is obtained, but the conventionally used polyether polyurethanes are also fully useful herein.

SUMMARY OF THE INVENTION

The present invention provides liquid acrylate-terminated polyurethane coating compositions which cure rapidly on ultraviolet exposure, but which possess improved adhesion and superior water resistance. These coating compositions comprise, in addition to the acrylate-terminated polyurethane and a monoethylenically unsaturated liquid having a glass transition temperature, measured on a homopolymer thereof, below about 0° C. to reduce the modulus of the coating, a silsesquioxane oligomer polyacrylate in an amount of from about 2% to about 6%, based on the total weight of the coating composition.

It is desired to point out that these silsesquioxane oligomer polyacrylates are formed by a reaction between a silanol group and an acrylate ester having a terminal hyroxy group. The silanol group is acidic and it reacts with the terminal hydroxy group in a condensation reaction in which water is removed to provide a Si—O—C linkage. The acrylate ester group remains, so the product is still an acrylate, albeit the acrylic moiety is not directly linked to the silsesquioxane oligomer by an ester group.

Ultraviolet light normally identifies a wavelength ranging from about 200 to about 400 nanometers, and this represents the wavelength usually employed. However, the wavelengths which are useful include light in th visible range not too far removed from the ultraviolet range.

Accordingly, it is intended to include herein compositions which are curable with actinic light in or near the ultraviolet range, so the compositions used herein are broadly identified as being light-curable. It will be understood that the wavelengths used herein are not different from those customarily used.

The compositions of this invention include the usual about 1% to about 10% of ketonic photoinitiators to initiate cure when exposed to radiation having the appropriate wavelength. These photoinitiators, such as benzophenone, acetophenone, or the like as further illustrated in the Examples, can be used alone or together with agents which speed the cure, such as amines, or in combination with photosensitizers, such as dyes, which extend the range of wavelengths which can be used for cure.

The acrylate-terminated polyurethanes are themselves known, and these are usually used in combination with liquid acrylates having a low glass transition temperature (measured on a homopolymer of the monomer) to soften the cured coatings and lower their modulus to permit use of the compositions of this invention as primary coatings or single coatings for optical glass fiber.

The silsesquioxane oligomers are polysilanols having the general random structure shown below:

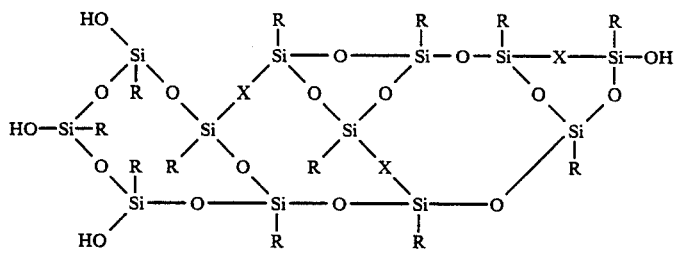

in which R identifies a monovalent hydrocarbon group containing from 1 to 10 carbon atoms, preferably $C_1$-$C_4$ akyl, phenyl, or a mixture thereof, and X, which is preferably oxygen, is selected from oxygen, siloxane, polysiloxane and O—$R_1$—Si linkages, where $R_1$=$C_1$-$C_4$ alkylene.

When these polysilanols, which are generally tetrasilanols, are condensed with an hydroxy alkyl acrylate, from about 1-3 of these silanol groups react with the hydroxyalkyl acrylate, and most of the balance of the silanol groups react with themselves to increase the molecular weight. The result is a polycyclic polyacrylate.

The preferred silsesquioxane polysilanols can be regarded as a polysilanol having the formula:

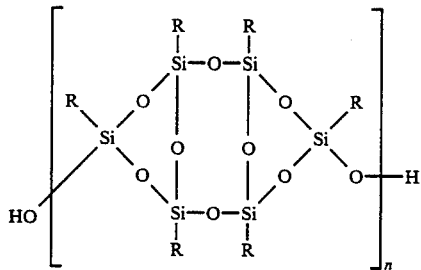

in which R is the same as previously noted, and n is a number having an average value of from 1-3, preferably about 2.

When two molar proportions of hydroxyalkyl acrylate are condensed with the above polysilanol, the product is generally identified as a diacrylate.

DETAILED DESCRIPTION OF THE INVENTION

As previously indicated, the coating compositions of the present invention comprise an acrylate-terminated polyurethane and a silsesquioxane oligomer polyacrylate. To provide liquidity and low modulus, these coating compositions further include a reactive diluent which is a monoethylenically unsaturated liquid having a glass transition (measured on a homopolymer of the monomer as noted previously) below about 0° C. and which reduces the glass transition temperature of the coating. These unsaturated liquids are normally acrylate ethers, typically ethoxyethoxyethyl acrylate and phenoxyethyl acrylate. The proportion of the reactive diluent is determined by the amount needed to provide coating viscosity, but these ethers tend to introduce sensitivity to water, so it is desired to minimize the need for such reactive diluents, and also to counteract their tendency to decrease the resistance to water.

With respect to the proportion of the reactive diluent component, it will be seen in the data tabulated hereinafter, that the addition of the acrylated silsesquioxane oligomer does not change the proportion of the reactive diluent, so the proportion of this component in the entire composition is reduced.

Referring more particularly to the acrylated polyurethanes which are used herein, these are usually diacrylates of isocyanate-terminated oligomers made from a polymeric diol or polymeric diamine, the acrylate-terminated oligomers having a molecular weight in the range of about 2000 to about 8000 daltons. The polyurethane preferably contains from about 4 to about 12, more preferably from 5-10 urethane and/or urea groups per molecule. While the acrylated compositions used herein are generally diacrylates, the compositions may have an average acrylate functionality somewhat below or above 2.0. Acrylate functionality in excess of an average of two can be obtained in various ways, as when a monohydric polyacrylate is used to cap the polyurethane, or when a small proportion of triol is used in the formation of the polyurethane.

As is known, the acrylate-terminal group is introduced with a urethane linkage by the reaction of the isocyanate group with an hydroxy group supplied by a monohydric acrylate, typically 2-hydroxyethyl acrylate. $C_2$-$C_4$ alkyl acrylates are contemplated, as well as polyacrylates, such as glyceryl diacrylate.

The silsesquioxane oligomer polyacrylates which are used are provided by the reaction of an hydroxyalkyl acrylate in which the alkyl group contains from 2 to 4 carbon atoms, with a silsesquioxane oligomer polysilanol. These polysilanols are cyclic compounds having the formula set forth previously. The reaction is a simple condensation reaction in which the water of reaction is removed to produce a Si—O—C linkage. About two moles of the hydroxyalkyl acrylate are reacted with about one mole of the polysilanol.

The proportion of the silsesquioxane oligomer polyacrylate which should be used, was broadly defined previously, and is preferably from 5% to 55%, most preferably from 8% to 30%, based on the total weight of the coating composition.

While the Dow Corning product Z-6018 available in commerce is presently preferred, other commercial materials are available and can be used, such as the commercial product SR-187 from General Electric Company. Another Dow Corning product which can be used is identified by that company as 6-2230, and this contains about 20 mole percent of dimethyl siloxane in combination with a phenyl silsesquioxane oligomer, so the silsesquioxane product used may contain other silicone materials in minor proportion.

As a contrast with this invention, we have attempted to obtain useful results by adding 3-methacryloxypropyl trimethoxy silane, a known adhesion promoter, in small amounts. This agent improves adhesion slightly, but it reduces cure speed. Thus, when used in an amount of 0.5%, it provides some improved adhesion, but the cure speed is significantly reduced. Larger amounts used in an effort to further improve adhesion caused even greater reductions in cure speed, and they also increase the coating's propensity towards water absorption. Thus, this invention provides significant improvement, as documented below, where the best prior art additive known to us is not effective.

The invention is illustrated in the tabulation which follows in which a known primer composition is modified by the addition of various proportions of the silsesquioxane oligomer polyacrylates of this invention. It will be understood that throughout this application, including the tabulation which follows, all parts and proportions are by weight, unless otherwise specified.

TABLE

| Component | Ex. 1 | Ex. 2 | Ex. 3 | Ex. 4 | Ex. 5 |
|---|---|---|---|---|---|
| Polyurethane (1) | 95.0% | 90.0% | 85.0% | 43.6% | 100% |
| Silsesquioxane Polyacrylate (2) | 5.0% | 10.0% | 15.0% | 50.0% | — |
| 2-PEA | — | — | — | 6.1% | — |
| DC 57 (3) | — | — | — | 0.3% | — |
| Dry adhesion (peel strength (4)) | 17.9 | 21.8 | 24.9 | 190 | 16.1 |
| Wet adhesion (peel strength (4)) | 5.5 | 8.5 | 5.5! | 14.0 | 4.9 |
| Water absorption (5) | — | — | — | 0.1 | 2.4 |
| Water Extractables (5) | — | — | — | 2.5 | 3.4 |

(1) identifies a polyurethane solution containing 70.5% of acrylate-terminated polyurethane, 24.5% ethoxyethoxyethyl acrylate, 4% hydroxycyclohexyl phenyl ketone (Irgacure 184 from Ciba-Geigy, Ardsley, NY) as photoinitiator, and 1% of stabilizers (the stabilizers are optional). The acrylate-terminated polyurethane is made by reacting 2 moles of 2-hydroxyethyl acrylate with 1 mole of a polyoxytetramethylene glycol having a number average molecular weight of 650 and 1 mole of the isocyanate-terminated reaction product of two molar proportions of methylene-bis 4-cyclohexyl isocyanate with one molar proportion of polyoxytetramethylene glycol having a number average molecular weight of 1000. This urethane-forming reaction is carried out in ethoxyethoxyethyl acrylate in the presence of 1% of dibutyltin dilaurate catalyst for the reaction. 2-PEA identifies 2-phenoxyethyl acrylate.
(2) identifies the diacrylate (prepared as described hereinafter) of a commercial silsesquioxane disilanol oligomer obtained from Dow Corning under the trade designation Z-6018. It has an average molecular weight of about 1600, so n in the formula previously set forth has an average value of about 2, and R is a mixture of phenyl and propyl groups, there being about 2.3 phenyl groups for every propyl group.
(3) identifies a polymethyl siloxane flow control agent which helps to compatibilize the components of the composition with one another.
! this value is anomalous since it does not fit the pattern of all the other results. Since this run was not repeated to insure its accuracy, it is concluded to represent experimental error.
(4) Peel strength, reported in grams, is determined by applying a 3 mil thick coating to a glass substrate and pulling a specimen having a width of 1.0 inch using a 10 inch per minute strain rate. The wet adhesion tests were run after exposure for 24 hours to a humid atmosphere having a relative humidity of 95%.
(5) the reported measurements are after immersion in water at room temperature for 24 hours.

The tabulated coatings were deposited as a film 3 mils thick on glass, cured by exposure to ultraviolet light using a dosage of 1.0 J/sq. cm., and then stripped from the glass to provide a film whose properties were measured. As is evident from the data, dry adhesion was improved steadily as the proportion of the silsesquioxane oligomer diacrylate increased. The wet adhesion also improved, albeit not as markedly. Also, cure speed did not deteriorate. Even though 50% of the composition was constituted by the silsesquioxane oligomer diacrylate in Example 4, it still converted to a tack-free film upon the specified ultraviolet exposure which represents a rapid cure.

The silsesquioxane oligomer diacrylate was made by placing in a 1 liter, 4-neck flask 576.3 grams of Dow Corning's product Z-6018, described previously. To the flask were added 239.9 grams of 2-hydroxyethyl acrylate and 0.7 grams of phenothiazine stabilizer. The flask was fitted with a thermometer and a Dean-Stark tube fitted with a condenser so that distillate could be collected. The contents of the flask were heated until all of the ingredients melted and then a sparge tube was added and dry air was bubbled through the liquid.

Heating was continued, and at 162° C., distillate began to collect. Heating was continued until 18.5 ml. of water was distilled from the flask. The final temperature was 167° C. The refractive index of the distillate was found to vary from 1.347 to 1.359 during the course of the distillation. The deviations from the refractive index value for pure water are attributed to small amounts of 2-hydroxyethyl acrylate and other impurities that azeotrope over in the distillate.

The product produced above was cooled and packaged for subsequent use. The refactive index was 1.5175, the density was 10.4 pounds per gallon, and the Brookfield viscosity was 19,300 centipoises (measured with a #6 RV bob at 25° C.)

The liquid coating compositions of claims 1–4 are applied to freshly drawn optical glass fiber in a thickness of 3 mils and exposed to ultraviolet light (dosage of 1.0 Joules per square centimeter) to cure the coatings. The cured coatings are useful as primary coatings on the glass fiber, and some of them are hard enough to be used as single coatings.

What is claimed is:

1. A light-curable ethylenically unsaturated liquid coating composition which cures to provide low modulus coatings adapted for the primary or single coat coating of optical glass fiber and having improved adhesion comprising:
   (1) an acrylate-terminated polyurethane oligomer;
   (2) a monoethylenically unsaturated liquid having a glass transition temprature, measured on a homopolymer thereof, below about 0° C. and which reduces the modulus of the coating; and
   (3) a silsesquioxane oligomer polyacrylate which is the condensation reaction product of about two moles of hydroxyalkyl acrylate in which the alkyl group contains from 2 to 4 carbon atoms, with about one mole of a silsesquioxane polysilanol, the proportion of said silsesquioxane oligomer polyacrylate being in the range of from about 2% to about 60% of the weight of said coating composition.

2. A liquid coating composition as recited in claim 1 in which said acrylate-terminated polyurethane oligomer is made using polycarbonate or polyester diol in the production of said polyurethane.

3. A liquid coating composition as recited in claim 1 in which said acrylate-terminated polyurethane oligomer is a diacrylate of an isocyanate-terminated oligomer made from a polymeric diol, said oligomer having a molecular weight in one range of about 2000 to about 8000.

4. A liquid coating composition as recited in claim 1 in which coating viscosity is provided by the presence of a monoethylenically unsaturated liquid having a glass transition temperature, measured on a homopolymer thereof, below about 0° C. and which reduces the glass transition temperature of the coating.

5. A liquid coating composition as recited in claim 4 in which said monoethylenically unsaturated liquid is an acrylate ether.

6. A liquid coating composition as recited in claim 1 in which said silsesquioxane oligomer polyacrylate is present in an amount of from 5% to 55%, based on the total weight of the coating composition.

7. A liquid coating composition as recited in claim 6 in which said silsesquioxane oligomer polyacrylate is present in an amount of from 8% to 30%, based on the total weight of the coating composition.

8. A liquid coating composition as recited in claim 1 in which said silsesquioxane oligomer has the formula:

in which R identifies a monovalent hydrocarbon group containing from 1 to 10 carbon atoms, and X is selected from oxygen, siloxane, polysiloxane and O—$R_1$—Si linkages where $R_1$=$C_1$ to $C_4$ alkylene.

9. A liquid coating composition as recited 30 in claim 8 in which said silsesquioxane oligomer has the formula:

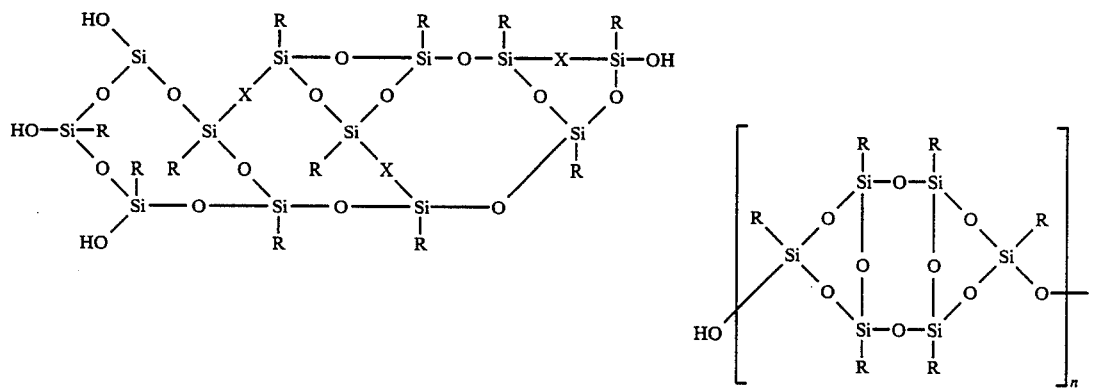

in which R is selected from propyl and phenyl, and n is a number having an average value of from 1-3.

10. A liquid coating composition as recited in claim 9 in which and n is an average value of about 2.

11. A liquid coating composition as recited in claim 1 in which said composition includes from about 1% to about 10% by weight of a ketonic photoinitiator.

12. An optical glass fiber coated with a light-cured coating of the composition of claim 9.

UNITED STATES PATENT AND TRADEMARK OFFICE
CERTIFICATE OF CORRECTION

PATENT NO. : 4,889,901

DATED : December 26, 1989

INVENTOR(S) : Sami A. Shama and John L. Derer

It is certified that error appears in the above-identified patent and that said Letters Patent is hereby corrected as shown below:

In the abstract, Lines 7-11 should be shifted to the left by three letters.

Col. 2, Line 19, "6" should be -- 60 --.

Signed and Sealed this

Eighteenth Day of February, 1992

Attest:

HARRY F. MANBECK, JR.

*Attesting Officer*   *Commissioner of Patents and Trademarks*